Jan. 13, 1959  W. E. LEUSZLER ET AL  2,868,314
APPARATUS FOR SEPARATING FLUIDS
Filed Jan. 18, 1956  3 Sheets-Sheet 1

WAYNE E. LEUSZLER,
LOREN E. WOOD, &
ALVIN P. TEAL
INVENTORS.

BY
ATTORNEY

Jan. 13, 1959  W. E. LEUSZLER ET AL  2,868,314
APPARATUS FOR SEPARATING FLUIDS
Filed Jan. 18, 1956
3 Sheets-Sheet 2
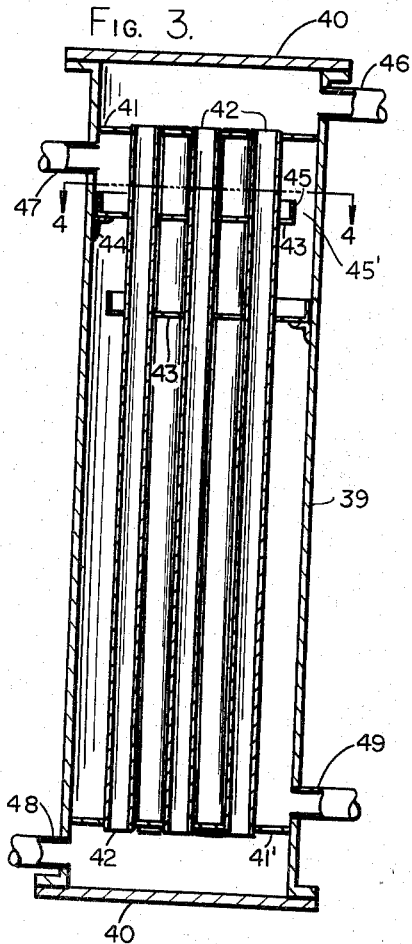
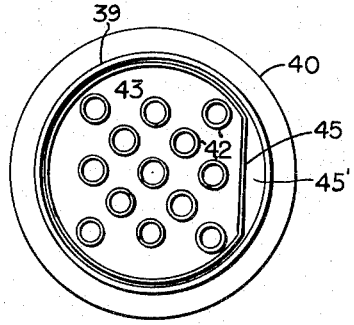
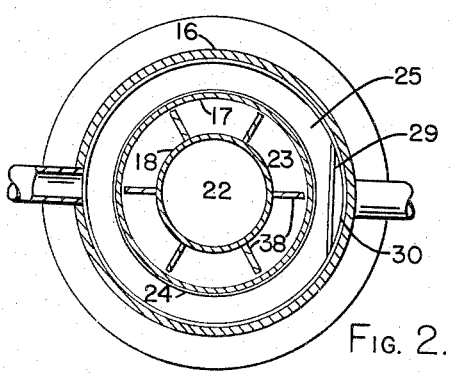
WAYNE E. LEUSZLER,
LOREN E. WOOD, &
ALVIN P. TEAL
*INVENTORS.*
BY
ATTORNEY

WAYNE E. LEUSZLER,
LOREN E. WOOD, &
ALVIN P. TEAL

*INVENTORS.*

BY

ATTORNEY though the most desirable will be the particular method which will require the least additional heating and which will also make use of the available heat supplied to the treating vessel.

United States Patent Office 2,868,314
Patented Jan. 13, 1959

2,868,314

APPARATUS FOR SEPARATING FLUIDS

Wayne E. Leuszler and Loren E. Wood, Oklahoma City, Okla., and Alvin P. Teal, Alice, Tex., assignors to Black, Sivalls & Bryson, Inc., Kansas City, Mo., a corporation of Delaware Application January 18, 1956, Serial No. 559,980

3 Claims. (Cl. 183—2.7)

The present invention relates generally to devices for treating crude oil and water emulsions to separate the components of such emulsions. Specifically this invention relates to apparatus for conserving the heat which is supplied to an emulsion treating device.

The treating of oil and water emulsions is a problem which varies with the emulsion. The addition of heat is necessary in treating to aid in the separation of the water from the oil. When the emulsion being produced has a tendency to be foamy, it is necessary to preheat the emulsion before attempting to separate the gas. This preheating may be done in various ways but obviously the most desirable will be the particular method which will require the least additional heating and which will also make use of the available heat supplied to the treating vessel.

Therefore, the primary object of the present invention is to provide apparatus for treating oil and water emulsions having means for preheating the emulsion prior to attempting to separate the gas from the emulsion.

Further objects of the present invention are to provide a device for preheating the emulsion stream with available heat; to provide a device having means for obtaining efficient heat transfer in preheating an emulsion stream; to provide a method of and an apparatus for using the heat in the water and in the treated oil of an emulsion treater to preheat the emulsion stream; and to provide a method of and an apparatus for preheating an emulsion stream by heat exchange with both hot water and hot treated oil from a treating device.

In accomplishing these and other objects of the present invention we have provided improved details of structure, the preferred form of which is illustrated in the accompanying drawing wherein:

Fig. 2 is a sectional view of the preheater taken along lines 2—2 in Fig. 1.

Fig. 3 is a sectional view of another form of heat exchanger embodying the novel principles of the present invention.

Fig. 4 is a partial sectional view of the heat exchanger in Fig. 3 taken along lines 4—4 in Fig. 3.

Figure 1:
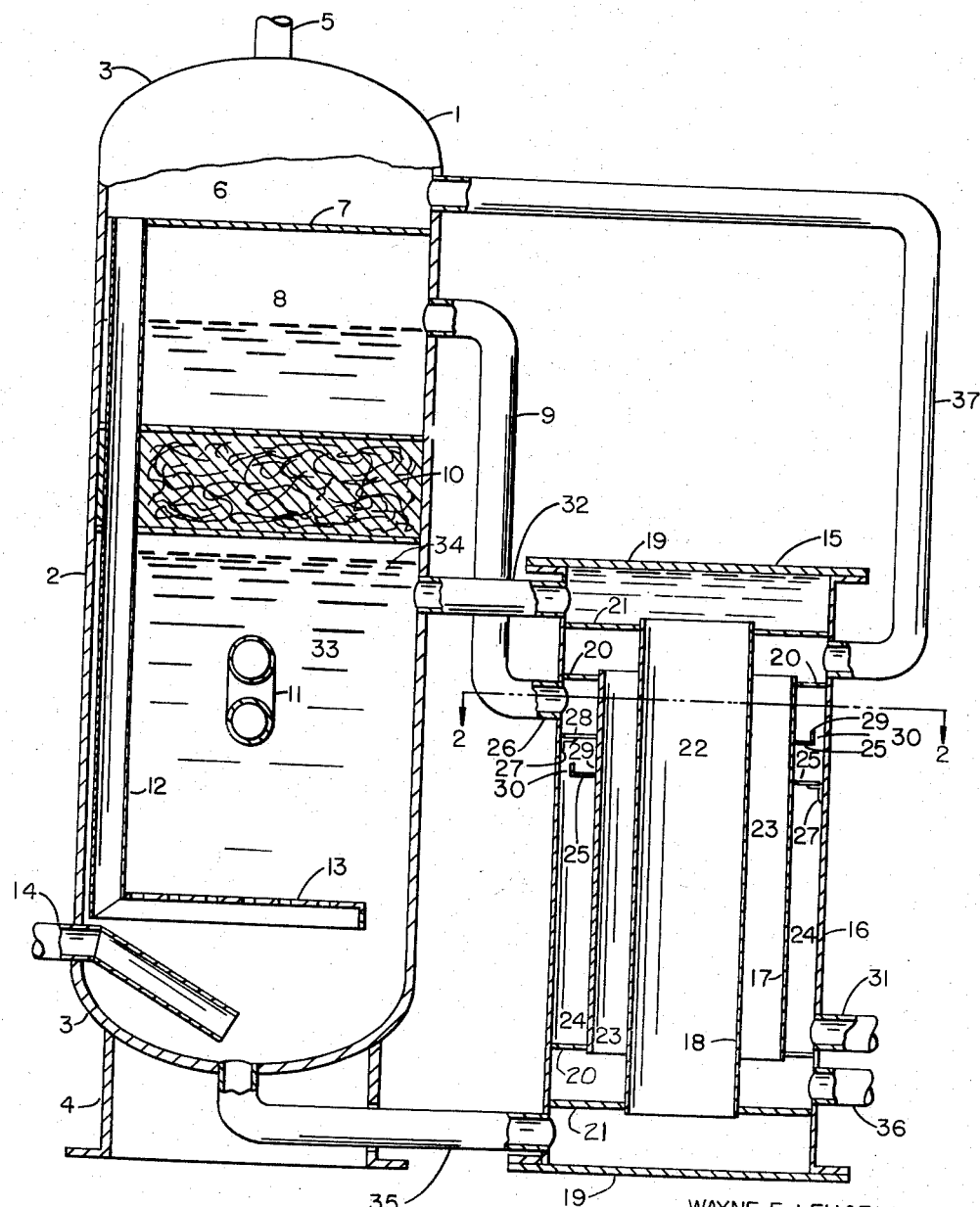
Fig. 1 is a schematic view of an emulsion treater and an accompanying external preheater.

Emulsion treater 1 of Fig. 1 is shown to be a vertical vessel 2 having each end closed by heads 3 and supported on a base 4. Gas outlet duct 5 extends out through the upper head 3 from gas separating chamber 6. Partition 7 separates gas separating chamber 6 from treating chamber 8. Oil outlet duct 9 extends from the upper portion of treating chamber 8. Filter bed 10 is positioned in treating chamber 8 above heater 11. Downcomer 12 leads from gas separating chamber 6, through partition 7 and down to spreader plate 13 which is positioned in treating chamber 8 below heater 11. Water outlet duct 14 extends from a position in the lower portion of treating chamber 8 out through vessel 2 to discharge the water collecting in the treater 1 under the control of a valve (not shown).

Emulsion preheater 15 is composed of three concentric shells 16, 17 and 18 each having a separate inlet and outlet as hereinafter described. Outer shell 16 extends over the entire length of preheater 15 and is closed at each end by flanges 19. Shell 17 is immediately within shell 16 and the annular space between shell 16 and 17 is closed at each end by annular rings 20 which are secured to the inner side of shell 16 and the outer side of shell 17. Inner shell 18 is positioned within shell 17 and the space between shell 18 and 16 is closed by annular rings 21. Emulsion preheater 15, therefore, has three elongated passageways; hot water passageway 22 within shell 18, influent emulsion passageway 23, and treated oil passageway 24.

Spreader tray 25 is disposed in treated oil passageway 24 a short distance below oil inlet connection 26 into preheater 15. Tray 25 is held in position by clips 27 secured to shell 16. Tray 25 is composed of an annular plate 28 and an upstanding flange 29 across a minor chord on the outer periphery of plate 28. Tray 25 is formed to provide an overflow passageway 30 between flange 29 and shell 16. Tray 25 is fabricated so that when installed in preheater 15 that it will substantially block passageway 24 but plate 28 is spaced slightly from shell 16 around its outer periphery and from shell 17 around its inner periphery. Thus a small passageway is provided for the flow of treated oil down the inner surface of shell 18 and down the outer surface of shell 17.

Oil inlet connection 26 is connected to oil outlet duct 9 to conduct treated oil from heating chamber 8 to emulsion preheater 15. Oil outlet connection 31 is connected to the lower end of treated oil passageway 24 and extends out through shell 16 to discharge treated oil from preheater 15. Hot water inlet duct 32 connects the upper portion of hot water passageway 22 of preheater 15 to the portion of water zone 33 below water and emulsion interface 34 and above heater 11. Water return duct 35 connects the lower portion of hot water passageway 22 to the lower portion of water zone 33 below heater 11 and spreader plate 13. Emulsion inlet duct 36 is connected to the lower portion of influent emulsion passageway 23. Emulsion outlet duct 37 connects influent emulsion passageway 23 of preheater 15 to gas separating chamber 6. Fins 38 are secured to shell 18 and extend into influent emulsion passageway 23 as best shown in Fig. 2. For purposes of clarity, fins 38 are not shown in Fig. 1.

Figs. 3 and 4 illustrate a common multiple tube in shell heat exchanger. Outer shell 39 is closed at both ends by flanges 40. Tube sheet 41 is secured in shell 39 in spaced relationship to upper flange 40. Tubes 42 extend through tube sheet 41 to a second tube sheet 41' which is secured to shell 39 in spaced relationship to lower flange 40. Tray 43 is secured to shell 39 by clips 44 and has a flange 45 on a short chord of its periphery. Passageway 45' is formed between flange 45 and the inner surface of shell 39. Tray 43 is spaced slightly from the inner surface of shell 39 and also from the outer surface of tubes 42. Outlet 46 is provided to discharge the fluid flowing up through tubes 42 and the related inlet 48 is positioned in the lower portion of shell 39. Inlet 47 and outlet 49 are provided for the fluid which is to flow within shell 39 and surrounding tubes 42. When desirable, several trays 43 may be used, each being spaced to function properly in accordance with its desired function as hereinafter discussed. The outlet 49 for the fluid flowing within shell 39 and around tubes 42 is positioned in the lower portion of shell 39.

Figures 5, 6:
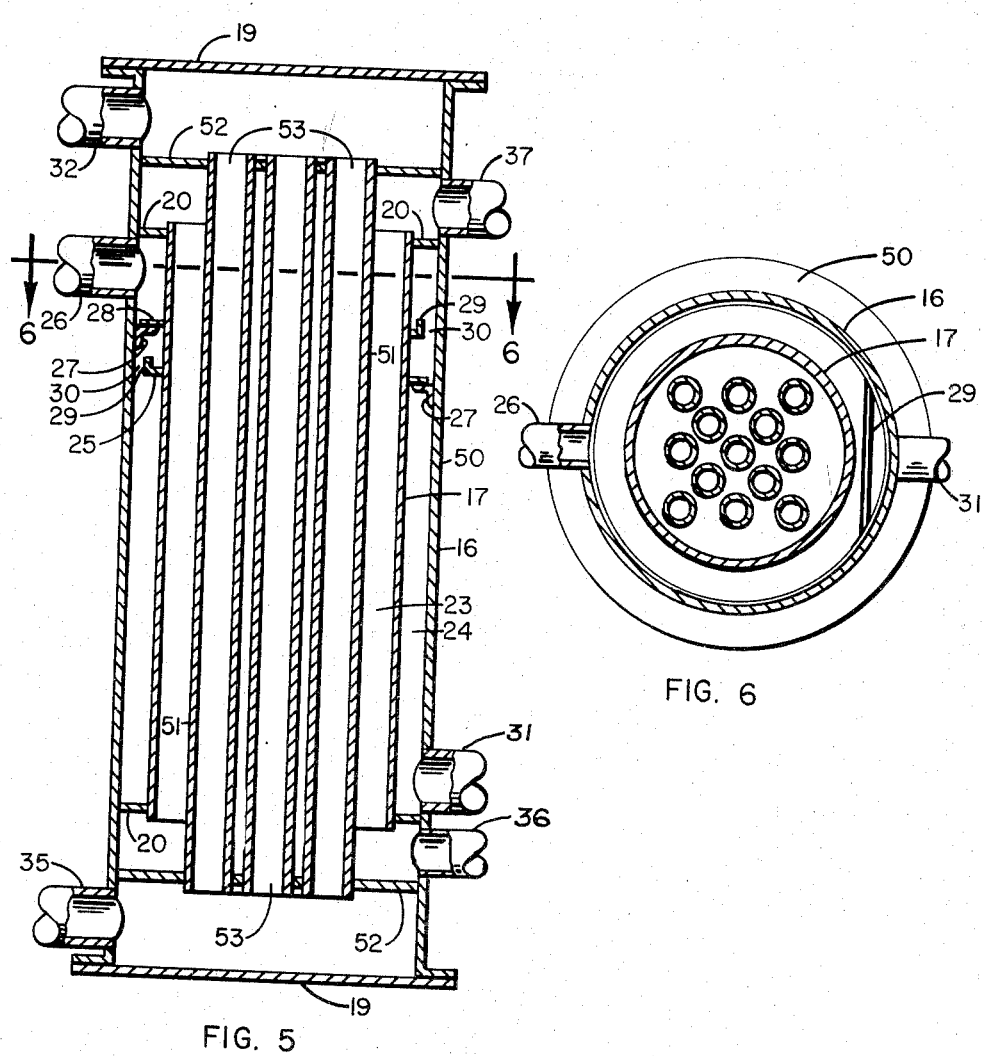
Fig. 5 is a sectional view of a modified form of external preheater.
Fig. 6 is a sectional view of the preheater in Fig. 5 taken along lines 6—6 in Fig. 5.

Figs. 5 and 6 illustrate a modified form of the preheater shown in Figs. 1 and 2. For purposes of clarity, parts common and identical in both forms of the preheater will retain the same numbering. Emulsion preheater 50 is composed of two concentric shells 16 and 17 surrounding a plurality of tubes 51. As previously discussed in relation to Figs. 1 and 2, outer shell 16 extends over the entire length of preheater 50 and is closed at each end by flanges 19. Shell 17 is immediately within shell 16 and the annular space between shells 16 and 17 is closed at each end by annular rings 20 which are secured to the inner side of shell 16 and the outer side of shell 17. Tubes 51 are positioned within shell 17 and the space between tubes 51 and shell 16 is closed by tube sheets 52 at each end of the tubes. Thus, emulsion preheater 50 is provided with three elongated passageways; the first, a plurality of hot water passageways 53 through tubes 51, second, influent emulsion passageway 23 and third, treated oil passageway 24.

Spreader plate 25 as shown in Fig. 5 is identical to spreader plate 25 as illustrated in Fig. 1. Also, the remaining portions of preheater 50 are identical to that previously described in describing preheater 15 of Figs. 1 and 2.

In operation treater 1 functions to assure the liberation of any gas present in the emulsion stream by heating the influent stream in emulsion preheater 15. This addition of heat will not only aid in separation of gas and prevent foaming but will also provide some of the heat necessary for treating the emulsion. Thus, the influent emulsion flows into emulsion inlet duct 36, up through emulsion passageway 23 and into gas separating chamber 6 through emulsion preheater outlet duct 37. Being warmed by preheater 15 the gas is readily separated and discharged from gas separation chamber 6 through gas outlet duct 5. The emulsion collects on partition 7 and flows down through downcomer 12. Emulsion discharged from downcomer 12 is spread into many upwardly rising rivulets by spreader plate 13. The emulsion passes up through the hot water zone 33 and water separates out to collect in water zone 33 while the remainder of the stream continues rising through filter bed 10 where any minute droplets of water remaining in the oil will be coalesced and allowed to settle into water zone 33. Treated oil passes out through oil outlet duct 9 and into emulsion preheater 15 through oil inlet connection 26 which is connected to duct 9 as shown. The hot treated oil entering emulsion preheater 15 flows down treated oil passageway 24 and collects on spreader tray 25. Tray 25 is positioned in passageway 24 so that the inner circumferential edges of plate 28 are slightly spaced from the exterior of shell 17 and also the outer circumferential edges of plate 28 are slightly spaced from the interior surface of shell 16. Thus the hot oil is caused to flow down through emulsion preheater 15 in a thin film on the interior surface of shell 16 and the exterior surface of shell 17. This feature provides a good heat transfer between the hot treated oil and the influent emulsion stream to heat the influent emulsion. The film flowing down the interior of the outer shell 16 provides a good insulation space between films of treated oil and also the oil is sufficiently cooled so that the lighter ends will not be vaporized and lost prior to and in storage.

The circulating of hot water from water zone 33 through hot water passageway 22 in emulsion preheater 15 is a thermal circulation. Water in water zone 33 is heated by heater 11 and rises, a portion of it flowing through hot water inlet duct 32 and into passageway 22. By heat exchange through shell 18 the hot water is cooled and caused to flow down passageway 22 thereby causing a thermal circulation through passageway 22 and into treater 1 through water return duct 35. This cooling of the hot water in passageway 22 causes the emulsion in passageway 23 to be heated. As an aid to obtain better heat exchange between the hot water and the influent emulsion, fins 38 are positioned within passageway 23 secured to shell 18.

In the heat exchanger illustrated in Figs. 3 and 4 the hot oil is utilized to warm the influent emulsion. The emulsion enters and flows up through tubes 42, passing out through outlet 46. The hot treated oil flows in through inlet 47 and collects on tray 43. The holes in tray 43 are slightly larger than the outer diameter of tubes 42, and therefore the hot treated oil is caused to flow down on the exterior surface of tubes 42 in a thin film to provide the best possible heat exchange. Also, a tray 43 is spaced from the inner surface of shell 39 to cause the excess hot treated oil to flow down on the interior surface of shell 39 in a thin film. This provides for additional cooling of the treated oil when the volume of oil flowing is greater than can be handled by the spaces between tray 43 and tubes 42. Flange 45 extends completely around tray 43 so that all of the treated oil will flow down around tubes 42 except when the flow of oil increases to larger flow rates as previously described herein. The passageway 45' is provided in case the hot oil flows at a greater rate through inlet 47 than it will flow through the space between tray 43 and tubes 42 and the space between tray 43 and shell 39. Therefore, it is often desirable to have at least two trays 43 in a unit to provide for intimate contact of the oil with the tubes 42. The operation of preheater 50 is identical with the operation of preheater 15 except that the flow of hot water is conducted downwardly through preheater 50 through the hot water passageways 53 within tubes 51. The influent emulsion is conducted in through emulsion inlet duct 36 and flows upwardly through influent emulsion passageway 23 and is discharged from preheater 50 through emulsion outlet duct 37. The warm treated oil being discharged from the treater flows into preheater 50 through oil inlet connection 26 and is distributed by spreader plate 25 in a thin film on the interior of shell 16 and the exterior of shell 17 and flows in such manner down passageway 24 and is discharged from preheater 50 through oil outlet connection 31.

Thus, we have provided a new and novel emulsion treating apparatus in which the emulsion is preheated in a manner to conserve heat while providing sufficient heat necessary for the preheating of the emulsion.

What we claim and desire to secure by Letters Patent is:

1. In combination with an emulsion treater having an emulsion inlet, a treated oil outlet and a hot water section, an emulsion preheater comprising, a first tubular duct, a second tubular duct within said first tubular duct, a third tubular duct within said second tubular duct, each of said tubular ducts being positioned vertically, an emulsion inlet into the lower portion of the emulsion flow space between said second duct and said third duct, an emulsion outlet from the upper portion of said emulsion flow space connected to the emulsion inlet of said emulsion treater, a hot water inlet into the upper portion of said third duct connected to the upper portion of the hot water section of said emulsion treater, a hot water outlet from the lower portion of said third duct connected to the lower portion of the hot water section of said emulsion treater, a treated oil inlet into the upper portion of said first duct connected to the treated oil outlet from said treater, a treated oil outlet from the lower portion of said first duct and at least two horizontal distributor plates positioned in the space between said first duct and said second duct, the inner and outer peripheries of said plates being in close spaced relationship to said second and said first ducts respectively to provide narrow passageways directing the flow of treated oil in thin films on the outer surface of said second duct and on the inner surface of said first duct.

2. Invention according to claim 1 including a plurality of third tubular ducts positioned within said second tubular duct.

3. Invention according to claim 1 including overflow passageways between each of said distributor plates and the interior surface of said first tubular duct, said overflow passageways being displaced circumferentially in relation to each other so that the overflow from one of said distributor plates will be caught by the next lower of said distributor plates.

References Cited in the file of this patent

UNITED STATES PATENTS

| | | |
|---|---|---|
| 544,437 | Kleemann | Aug. 13, 1895 |
| 546,946 | Theisen | Sept. 24, 1895 |
| 1,425,019 | Jordan | Aug. 8, 1922 |
| 2,457,959 | Walker | Jan. 4, 1949 |

FOREIGN PATENTS

| | | |
|---|---|---|
| 111,961 | Great Britain | Dec. 20, 1917 |